(12) United States Patent
Saito

(10) Patent No.: US 6,929,371 B2
(45) Date of Patent: Aug. 16, 2005

(54) PROJECTION DISPLAY SYSTEM AND PROJECTOR

(75) Inventor: Masami Saito, Tokyo (JP)

(73) Assignee: NEC Viewtechnology, Ltd., Tokyo (JP)

( * ) Notice: Subject to any disclaimer, the term of this patent is extended or adjusted under 35 U.S.C. 154(b) by 0 days.

(21) Appl. No.: 10/773,161

(22) Filed: Feb. 9, 2004

(65) Prior Publication Data

US 2004/0160763 A1 Aug. 19, 2004

(30) Foreign Application Priority Data

Feb. 19, 2003 (JP) ........................................ 2003-040983

(51) Int. Cl.⁷ .............................................. G03B 21/14
(52) U.S. Cl. ...................................... 353/122; 353/79
(58) Field of Search .......................... 353/79, 98, 119, 353/122; 248/917, 918

(56) References Cited

U.S. PATENT DOCUMENTS

| | | | | |
|---|---|---|---|---|
| 6,023,289 A | * | 2/2000 | Oravecz et al. ................ 348/77 |
| 6,247,815 B1 | * | 6/2001 | Inova ............................ 353/30 |
| 6,334,684 B1 | * | 1/2002 | Yoshida et al. ................ 353/28 |
| 6,379,012 B1 | * | 4/2002 | Enochs et al. ................. 353/79 |
| 6,626,541 B2 | * | 9/2003 | Sunaga ......................... 353/69 |
| 2001/0000300 A1 | * | 4/2001 | Haile-mariam .............. 353/30 |
| 2004/0080720 A1 | * | 4/2004 | Saito ............................ 353/79 |

FOREIGN PATENT DOCUMENTS

JP        6-237429        8/1994

\* cited by examiner

*Primary Examiner*—William C. Dowling
(74) *Attorney, Agent, or Firm*—Young & Thompson

(57) ABSTRACT

A projection display system can display large projected images onto a projection surface in a small space or a small room without occupying a space over a table or a desk placed therein, and can easily be detachably mounted in place and carried around. A projector installation fixture is mounted on a side end of an upper surface panel of the table or the desk near the projection surface, and a front-projection projector is detachably installed in place by the projector installation fixture. The front-projection projector has an optical system including an aspherical mirror at a final stage thereof.

15 Claims, 17 Drawing Sheets

PROJECTION DISPLAY SYSTEM AND PROJECTOR

BACKGROUND OF THE INVENTION

1. Field of the Invention

The present invention relates to a projection display system and a projector, and more particularly to a projection display system and a projector which can be used in various occasions including conferences, presentations, training courses, educational events, etc., can effectively utilize space, and can easily be installed in place.

2. Description of the Related Art

It is the general practice today for attendants at conferences, presentations, training courses, etc., to project images, characters, information, etc., onto a large screen and give oral explanations using some display devices. There are available various display devices, and a suitable one is chosen depending on the size of the place where it is used and the number of people who attend the occasion.

Generally, front-projection projectors are often used in wide places attended by many people. Smaller places attended by fewer people see more opportunities to use rear-projection projectors, plasma display units, CRT display units, liquid crystal units, and TV sets.

There have been growing demands for display devices for displaying information such as images or the like on a large screen in meetings and training sessions that take place in small rooms and attended by a few people.

FIGS. 1A and 1B of the accompanying drawings illustrate a conventional projection display system which uses a front-projection projector in a small room. FIG. 1A is a plan view of the conventional projection display system as viewed from the ceiling, and FIG. 1B is a side elevational view of the conventional projection display system.

FIGS. 1A and 1B show a meeting room where a single table is placed and surrounded by a space large enough for 34 meeting attendants (observers) to be seated. Actually, there are many meeting rooms having such a meeting space. In recent years, particularly, offices or the like have many small rooms that are divided by partitions.

As shown in FIGS. 1A and 1B, general front-projection projector 32 is placed on upper surface panel 33 of a table that is put on floor 36 of such a small meeting room. Documents are spread or work is done on upper surface panel 33 of the table.

Light emitted from projector 32 as indicated by light path 7 is projected onto a partition wall of the room or screen 35 installed thereon.

Display devices other than the front-projection projector for use in such small meeting rooms include liquid crystal display devices that can be carried around. The liquid crystal display devices are generally small in screen size and tend to make the viewer uncomfortable watching projected images. It is preferable for liquid crystal display devices to have a screen size of 35 inches or more.

Recently, there are liquid crystal display devices having a large screen size. However, liquid crystal display devices with a larger screen size are heavier and make themselves hard to be carried around, as with plasma display devices and CRT display devices. Fixed installation of a large-screen display device that cannot be carried around in a small room as shown in FIGS. 1A and 1B is economically wasteful and not practical. Therefore, a front-projection projector that can easily be carried around is used in such a small room.

The front-projection projector is a projector for displaying image light that has passed through an optical system on a front screen at an enlarged scale. Technical details of the front-projection projector are disclosed in Japanese laid-open patent publication No. 6-237429, for example.

With the front-projection projector used in the conventional fashion as shown in FIGS. 1A and 1B, the projector is placed on the meeting table and the light path from the projector passes over the meeting table. Therefore, if an object is placed on the table or notes are taken on the table, then shadows are produced on the projected image on the screen. The space occupied by the projector itself and the space taken up by the projected light pose a limitation on the space available on the table, which cannot freely be used by the attendants.

Environments for using projectors in spaces smaller than the space shown in FIGS. 1A and 1B are problematic in that a sufficient space may not be available for the installation of a projector or enough space may not be available for the light path from a projector.

SUMMARY OF THE INVENTION

It is an object of the present invention to provide a projection display system which can display large images in a small space without occupying a space over a table placed therein, and which can easily be carried around.

Another object of the present invention is to provide a projector which makes the above projection display system feasible.

According to an aspect of the present invention, there is provided a projection display system for projecting images from a projector onto a projection surface, comprising a front-projection projector and a projector installation fixture for mounting the front-projection projector on a furnishing in a room where the projector is to be used or a component of the room. The projector is detachably mounted on the furnishing or the component by the projector installation fixture.

The projector has an optical system including an aspherical mirror at a final stage thereof. The projection display system with the aspherical mirror can display projected images at an enlarged scale through a wide projection angle over a short projection distance.

The furnishing comprises a table or a desk, and the projector installation fixture can be mounted on a side end of an upper surface panel of the table or the desk. The projector installation fixture may be arranged to install the projector such that at least a main projector unit thereof is positioned beneath an upper surface of the upper surface panel.

Alternatively, the component comprises a partition defining the room, and the projector installation fixture is mounted on an upper end of the partition to suspend the projector from the upper end of the partition.

Further alternatively, the component comprises a wall including a partition defining the room, and the projector installation fixture is mounted on a vertical surface of the wall.

The projector installation fixture may comprise a first member adapted to be mounted on the projector and a second member adapted to be mounted on the furnishing or the component, the first member and the second member being integral with each other. The first member may comprise an L-shaped member for placing the projector thereon, and the second member may comprise a channel-shaped member for inserting therein a portion of the furnishing or the component on which the projector is to be mounted.

Preferably, the projector installation fixture further comprises a slip prevention member attached to an inner surface of the channel-shaped member. The projector installation fixture should preferably further comprise a fixing fitting having a threaded structure for varying a gap in the channel-shaped member if the gap is greater than the thickness of the portion of the furnishing or the component on which the projector is to be mounted.

The first member may have a turning member angularly movable between a horizontal position and a vertical position. The turning member is angularly moved into the horizontal position to provide the L-shaped member when the projector is to be placed thereon.

In the projection display system, the projector installation fixture may comprise a first projector installation fixture adapted to be mounted on the projector and a second projector installation fixture adapted to be mounted on the furnishing or the component, the second projector installation fixture being separable from the first projector installation fixture. The first projector installation fixture and the second projector installation fixture can be coupled to each other when the projector is in use. Preferably, the first projector installation fixture has an L-shaped member for placing the projector thereon, and the second projector installation fixture has a channel-shaped member for inserting therein a portion of the furnishing or the component on which the projector is to be mounted. The second projector installation fixture should preferably further comprise a slip prevention member attached to an inner surface of the channel-shaped member.

The first projector installation fixture may have a downwardly directed U-shaped member, and the second projector installation fixture may have an opening for inserting therein the downwardly directed U-shaped member of the first projector installation fixture. When the U-shaped member is fitted over a plate that defines the opening, the first projector installation fixture and the second projector installation fixture are joined to each other.

The first projector installation fixture may have a plurality of the downwardly directed U-shaped members. The second projector installation fixture may have a plurality of the openings defined therein at different heights.

The first projector installation fixture and the second projector installation fixture may slidably be joined to each other.

Specifically, a pair of L-shaped rails may be mounted on either one of the first projector installation fixture and the second projector installation fixture, and protrusions may be mounted on the other one of the first projector installation fixture and the second projector installation fixture, for sliding movement in a space surrounded by the L-shaped rails.

According to another aspect of the present invention, there is also provided a front-projection projector of a projection display system for projecting images onto a projection surface, having a projector installation fixture for detachably mounting the projector on a furnishing in a room where the projector is to be used or a component of the room.

Preferably, the projector has an optical system including an aspherical mirror at a final stage thereof. The projector with the aspherical mirror can display projected images at an enlarged scale through a wide projection angle over a short projection distance. The projector installation fixture should preferably be a fixture for detachably mounting the projector on the furnishing or the component in coaction with a support-side installation fixture that is mounted on the furnishing or the component.

The projector installation fixture may have an L-shaped member for placing the projector thereon.

If the projector installation fixture is a fixture for detachably mounting the projector on the furnishing or the component in coaction with the support-side installation fixture that is mounted on the furnishing or the component, then the projector installation fixture may have a downwardly directed U-shaped member, and the projector may be detachably mounted on the furnishing or the component by the U-shaped member which is fitted over a plate that defines an opening in the support-side installation fixture. Alternatively, the projector installation fixture and the support-side installation fixture may have respective slidable structures slidably engageable with and disengageable from each other.

According to the present invention, a projector and one or more installation fixtures are combined with each other to detachably mount the projector simply on a side end of a desk or a table, a wall, a partition, or the like. With the projector thus installed, the upper surface of an upper surface panel of the desk or the table is not occupied by the projector, but can effectively be utilized.

If the projector has an optical system including an aspherical mirror at a final stage thereof, then the projector can display projected images at an enlarged scale through a wide projection angle over a short projection distance. Thus, even when the projector projects large images onto a screen, the projector can be installed near the screen. Consequently, not only the space over the upper surface panel of the desk or the table can effectively be utilized, but also the layout of furnishings in a meeting room where the projector is installed can be designed with increased freedom.

The above and other objects, features, and advantages of the present invention will become apparent from the following description based on the accompanying drawings which illustrate examples of preferred embodiments of the present invention.

BRIEF DESCRIPTION OF THE DRAWINGS

FIG. 3B is a front elevational view of the projector, and FIG. 3C is a side elevational view of the projector;

FIG. 10A is a side elevational view of the projector installation fixture, and FIG. 10B a front elevational view of the projector installation fixture;

FIG. 11A is a front elevational view of the projector installation fixture, FIG. 11B a side elevational view of the component, and FIG. 11C a plan view of the projector installation fixture;

DETAILED DESCRIPTION OF THE PREFERRED EMBODIMENTS

Figure 1A:
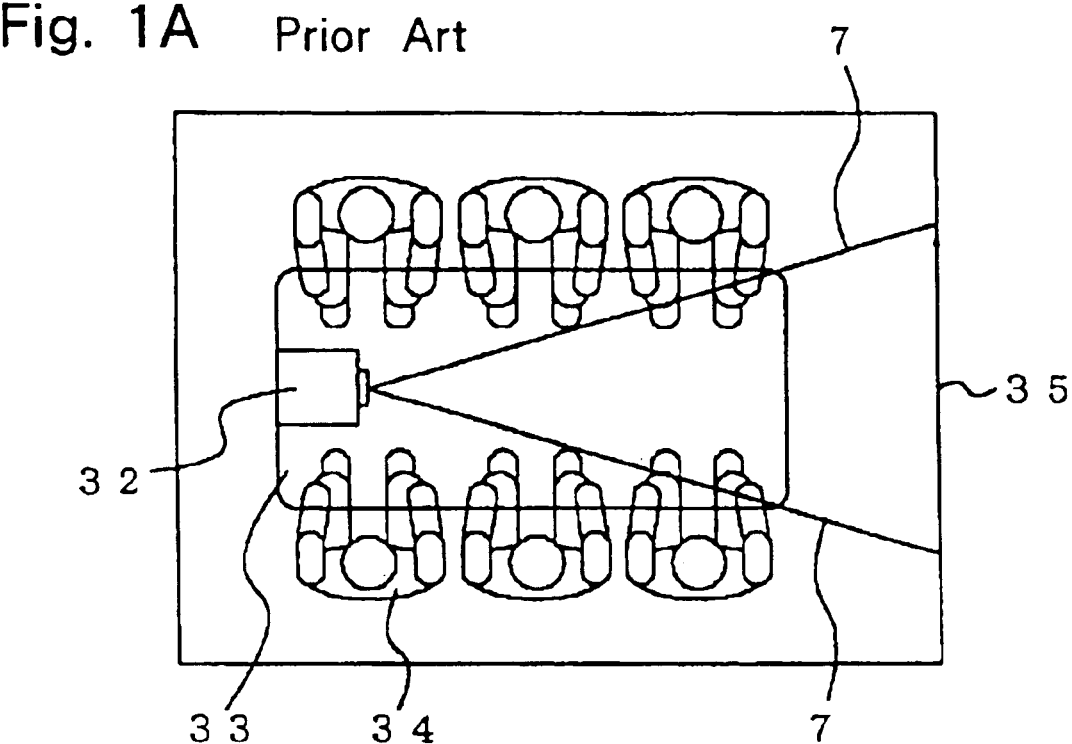
FIGS. 1A and 1B are views showing a conventional projection display system in a meeting room, FIG. 1A being a plan view of the conventional projection display system, and FIG. 1B a side elevational view of the conventional projection display system.
Figure 1B:
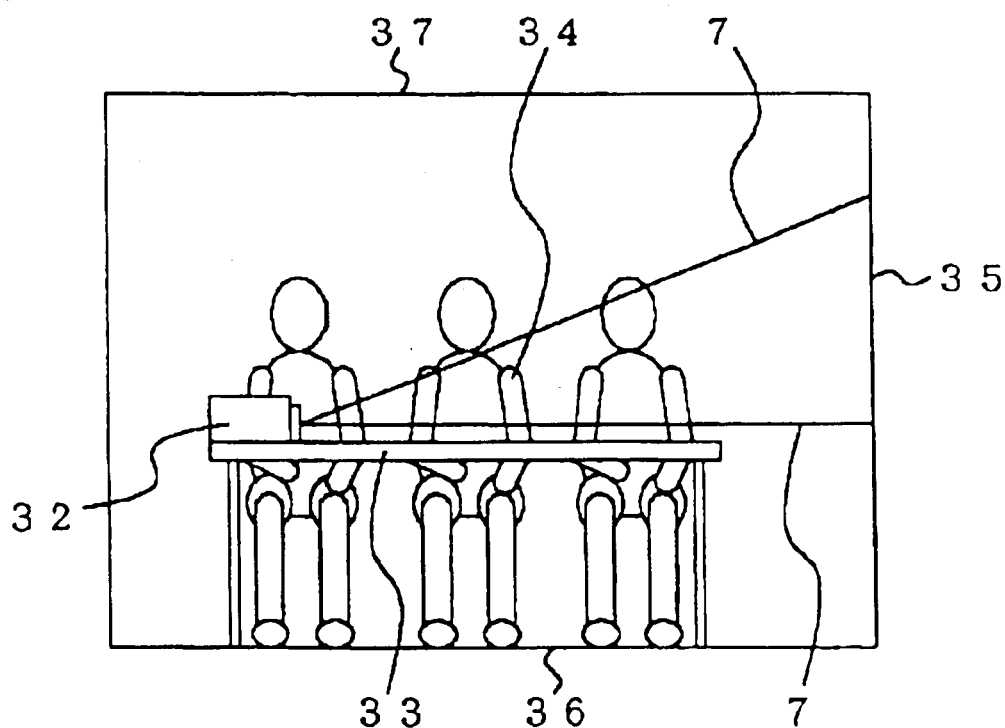
Figure 2A:
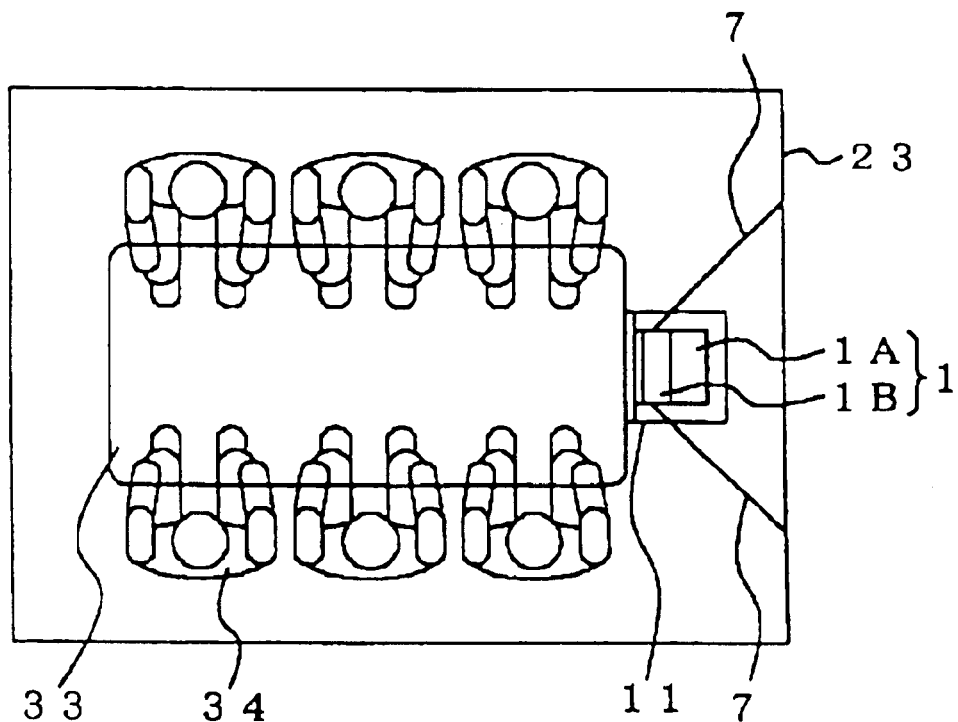
FIGS. 2A and 2B are views showing a projection display system according to a first embodiment of the present invention, FIG. 2A being a plan view of the projection display system, and FIG. 2B a side elevational view of the projection display system.
Figure 2B:
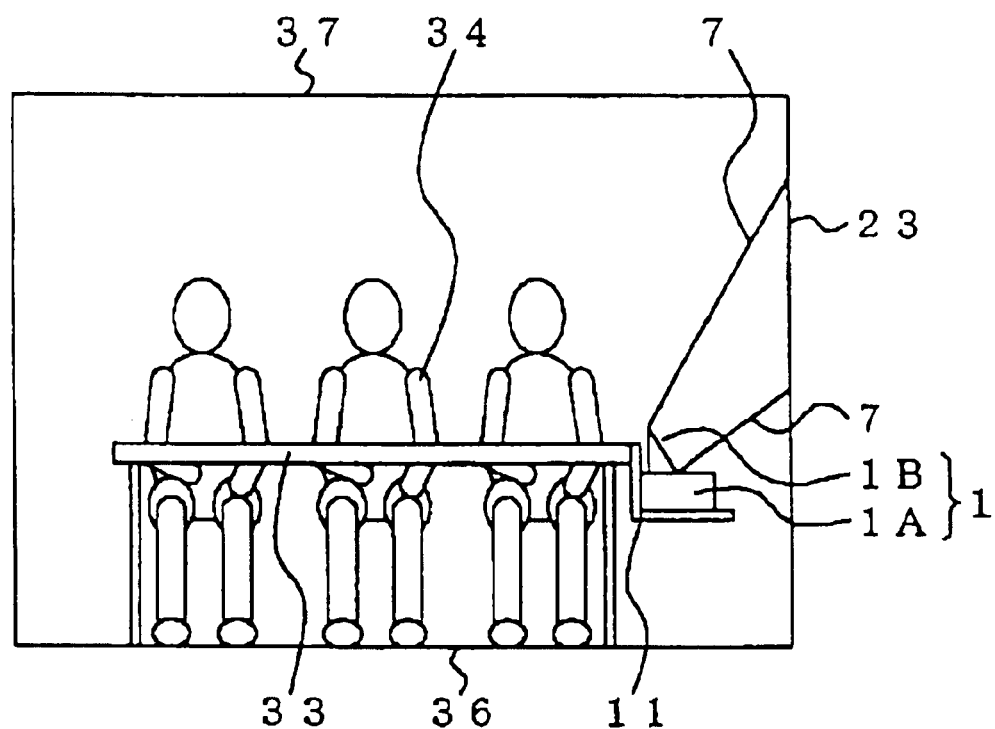

The preferred embodiments of the present invention will be described in detail below with reference to the drawings. FIGS. 2A and 2B are views showing a projection display system according to a first embodiment of the present invention, which is used in a meeting room according to one mode. FIG. 2A is a plan view of the projection display system, and FIG. 2B is a side elevational view of the projection display system.

As shown in FIGS. 2A and 2B, six meeting attendants (observers) 34 are seated around a meeting table that is put on floor 36 of a small meeting room, and are engaged in a meeting while seeing images displayed at an enlarged scale on projection screen 23.

According to the first embodiment, projector installation fixture 11 is detachably mounted on a side end, closer to projection screen 23, of upper surface panel 33 of the meeting table on which documents are spread and work is done. Front-projection projector 1 is placed on projector installation fixture 11 thus mounted.

Front-projection projector 1 comprises main projector unit 1A and aspherical mirror 1B at a final stage of an optical system thereof. Main projector unit 1A, exclusive of at least aspherical mirror 1B, is positioned below the upper surface of upper surface panel 33.

When an image signal is supplied from a personal computer (not shown) to main projector unit 1A, an image represented by the image signal is projected from aspherical mirror 1B through light path 7 onto projection surface 23 such as a screen which is placed on a partition wall of the meeting room or a wall of the meeting room.

With the arrangement shown in FIGS. 2A and 2B, projector 1 is suspended from the side end of upper surface panel 33 of the meeting table. Since projector 1 is not placed on upper surface panel 33 and light path 7 is not formed over upper surface panel 33, it is possible to provide a sufficient space for meeting attendants 34 to do work or spread documents on upper surface panel 33.

Figure 3A:
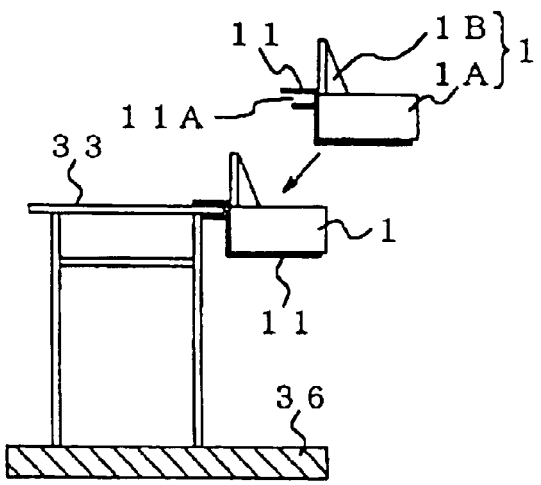
FIGS. 3A, 3B, and 3C are views of a projector of the projection display system according to the first embodiment, which is used in a meeting room according to one mode, FIG. 3A being a side elevational view showing the manner in which the projector is installed.
Figure 3B:
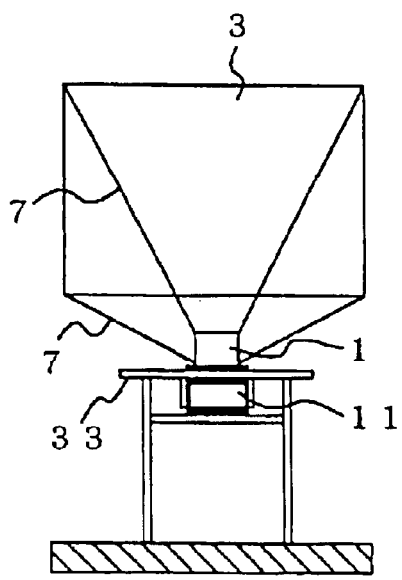
Figure 3C:
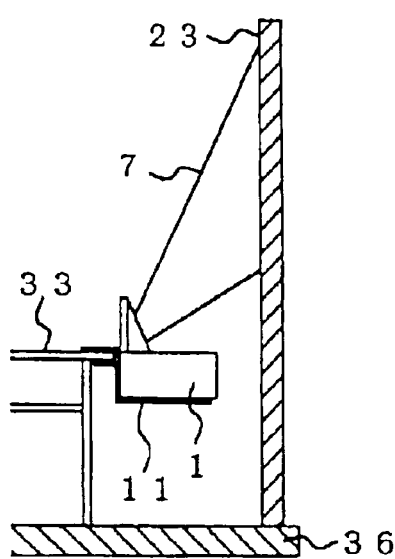

FIGS. 3A, 3B, and 3C are views of a projector of the projection display system according to the first embodiment, described later on, of the present invention, which is used in a meeting room according to one mode. FIG. 3A is a side elevational view showing the manner in which the projector is installed, FIG. 3B is a front elevational view of the projector, and FIG. 3C is a side elevational view of the projector.

Projector installation fixture 11 is in the form of a metal plate or an insulating plate. As shown in FIG. 3A, projector installation fixture 11 comprises channel-shaped member 11A for receiving the side end of upper surface panel 33 inserted therein, and an L-shaped member extending downwardly from channel-shaped member 11A. Projector 1 is placed on a horizontal portion of the L-shaped member.

Figure 4A:
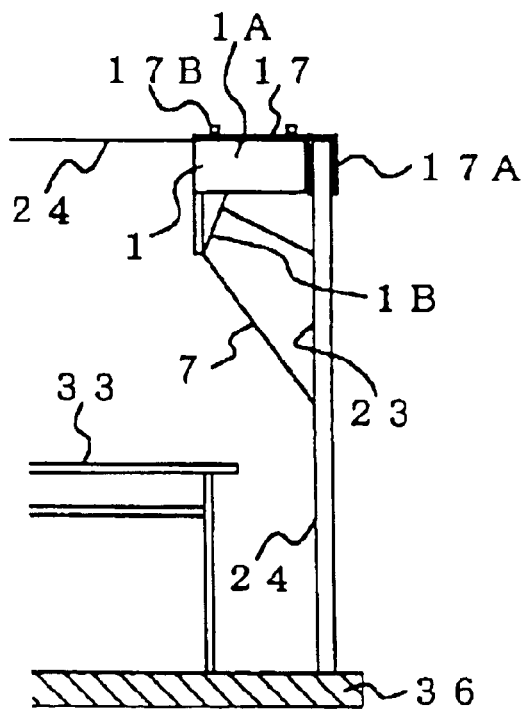
FIGS. 4A and 4B are views of the projection display system according to a fifth embodiment of the present invention, which is used in a meeting room according to another mode, FIG. 4A being a side elevational view of the projection display system, and FIG. 4B a front elevational view of the projection display system.
Figure 4B:
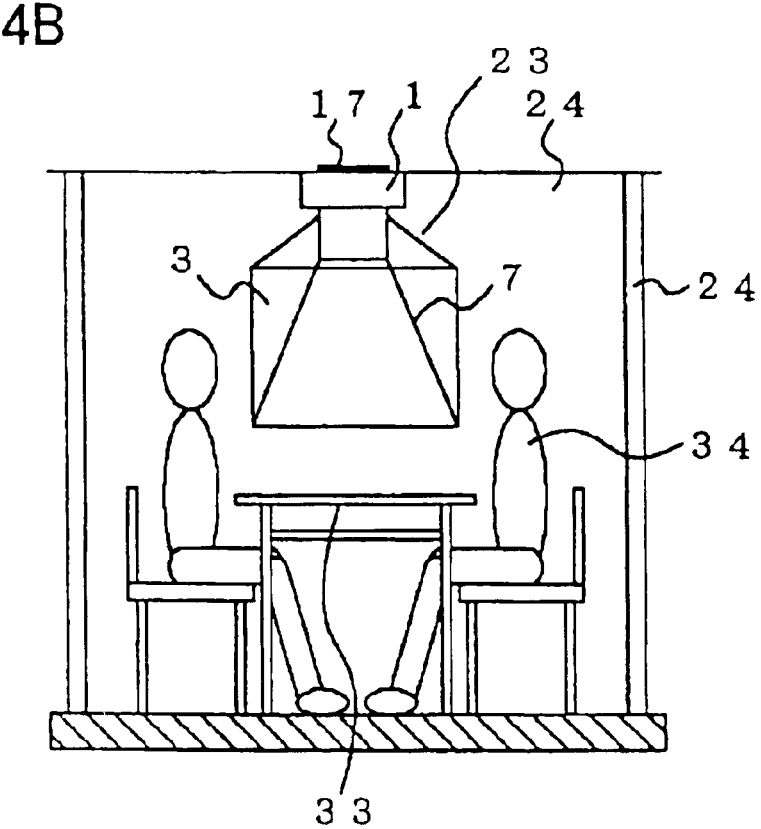

FIGS. 4A and 4B are views of the projection display system according to a fifth embodiment, described later on, of the present invention, which is used in a meeting room according to another mode. FIG. 4A is a side elevational view of the projection display system, and FIG. 4B is a front elevational view of the projection display system.

Projector installation fixture 17 is in the form of a metal plate or an insulating plate. Projector installation fixture 17 has channel-shaped member 17A fitted over an upper end of partition 24 inserted therein and a horizontal member extending from channel-shaped member 17A. Front-projection projector 1 is fastened to the horizontal member of projector installation fixture 17 by screws 17B so as to be suspended from the horizontal member. An image is projected from front-projection projector 1 through light path 7 onto partition 24 or a screen placed on partition 24.

With the arrangement shown in FIGS. 4A and 4B, since projector 1 is not placed on upper surface panel 33 of meeting table 33, it is possible to provide a sufficient space for meeting attendants 34 to do work or spread documents on upper surface panel 33.

Front-projection projector 1 in the present embodiment comprises main projector unit 1A and aspherical mirror 1B as a final stage of an optical system thereof. Image light emitted from main projector unit 1A, exclusive of aspherical mirror 1B, is enlarged by aspherical mirror 1B, and the enlarged image light is projected through light path 7 onto projection surface 23 on partition 24.

Figure 5:
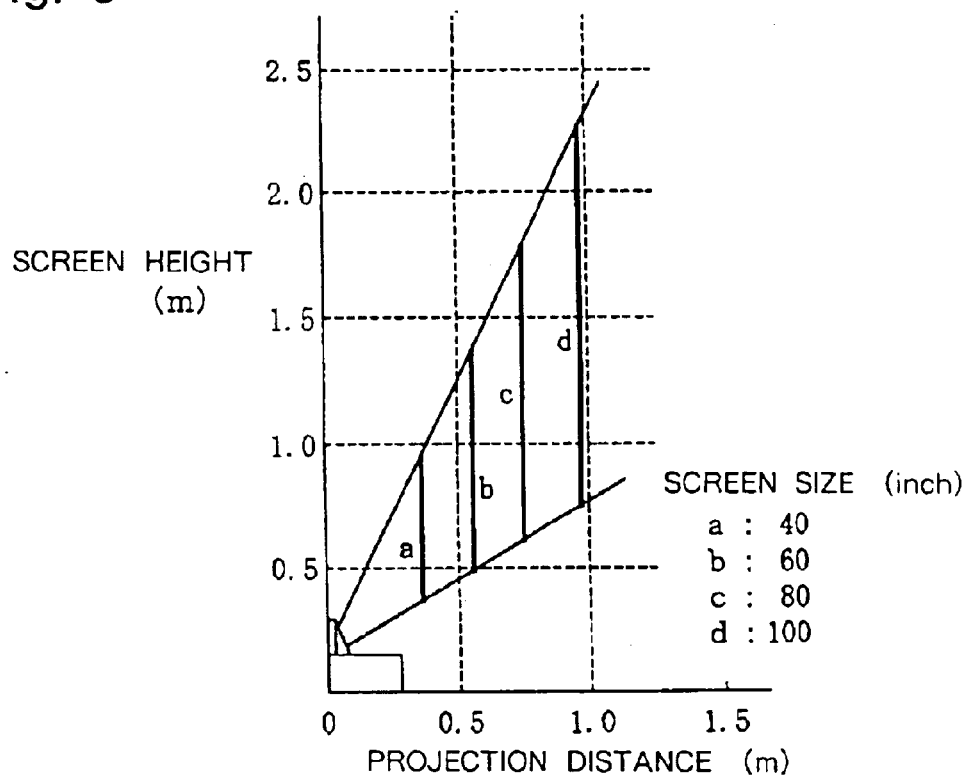
FIG. 5 is a diagram showing the relationship between distances from the rear end of the projector to the screen and screen sizes, and also showing projection angles in terms of screen heights.

FIG. 5 shows the relationship between distances from the rear end of the projector, which employs aspherical mirror 1B, to the screen and screen sizes, and also showing projection angles in terms of screen heights. As can be seen from FIG. 5, the projector is capable of projecting enlarged images through wider projection angles over much shorter projection distances than projectors which do not employ an aspherical mirror.

The numerical values shown in FIG. 5 are given by way of example only for representing optical characteristics of projector 1. Since changes in the projector characteristics are possible in a certain range, the projector according to the present invention is not limited to the numerical values shown in FIG. 5.

The projector according to the present invention has already been produced as a prototype having a height of 30 cm, a depth of 30 cm, a width of slightly less than 40 cm, and a weight of about 5 kg, with aspherical mirror 1B in an upstanding position. The size and weight of the projector according to the present invention can further be reduced. The projector has a mechanism (not shown) for selectively opening and closing aspherical mirror 1B. When the projector is not in use, the mechanism closes aspherical mirror 1B for protecting the mirror surface.

The first embodiment of the present invention will further be described below with reference to FIGS. 6A, 6B, 7A, 7B, and 8 together with FIGS. 3A, 3B, and 3C.

Figure 7A:
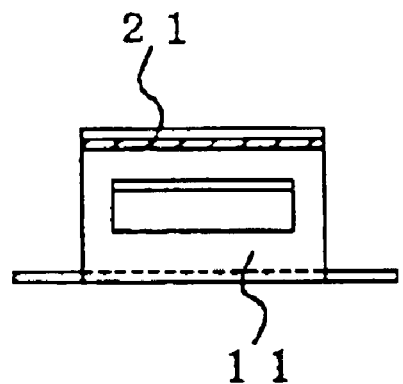
FIGS. 7A and 7B are views showing a projector installation fixture according to the first embodiment of the present invention, FIG. 7A being a front elevational view of the projector installation fixture, and FIG. 7B a side elevational view of the projector installation fixture.
Figure 7B:
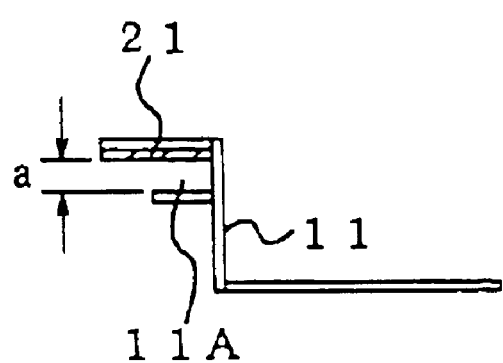

FIGS. 7A and 7B show projector installation fixture 11 according to the first embodiment of the present invention. FIG. 7A is a front elevational view of projector installation fixture 11, and FIG. 7B is a side elevational view of projector installation fixture 11. Projector installation fixture 11 is produced by bending a metal plate or an insulating plate, and comprises channel-shaped member 11A for sandwiching upper surface panel 33 of a table or a desk, and an L-shaped member extending from channel-shaped member 11A and to which main projector unit 1A of projector 1 can be fastened by screws or the like.

Figure 6A:
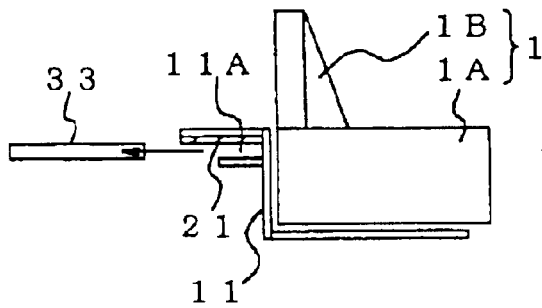
FIGS. 6A and 6B are views showing an installation structure according to the first embodiment of the present invention, FIG. 6A being a side elevational view of the installation structure immediately before the projector is installed, and FIG. 6B a side elevational view of the installation structure after the projector is installed.
Figure 6B:
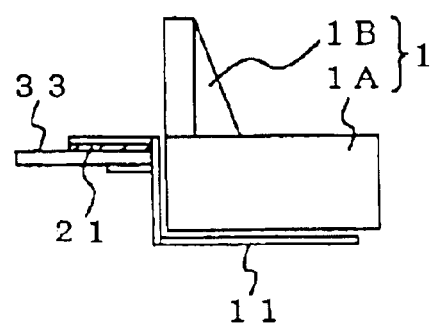

Projector installation fixture 11 is made of such a material and has such thickness that it has a mechanical strength large enough to prevent itself from being deformed or broken when channel-shaped member 11A of projector installation fixture 11 with projector 11 mounted thereon is attached to upper surface panel 33 of a meeting table or the like, as shown in FIGS. 6A and 6B.

Sheet-like slip prevention member 21 made of a material such as silicone rubber having a slip prevention function and having a suitable thickness is applied to an inner surface of channel-shaped member 11A of projector installation fixture 11 at an illustrated position thereon. Slip prevention member 21 serves to prevent projector installation fixture 11 from slipping or dropping off upper surface panel 33, thereby allowing projector 1 to be stably fixed to a table or a desk.

If a gap "a" (see FIG. 7B) present in channel-shaped member 11A of projector installation fixture 11 and the thickness of upper surface panel 33 are not appropriately related to each other, i.e., do not match each other, then it is necessary to combine projector installation fixture 11 with a suitable structure for adjusting the gap "a".

Figure 8:
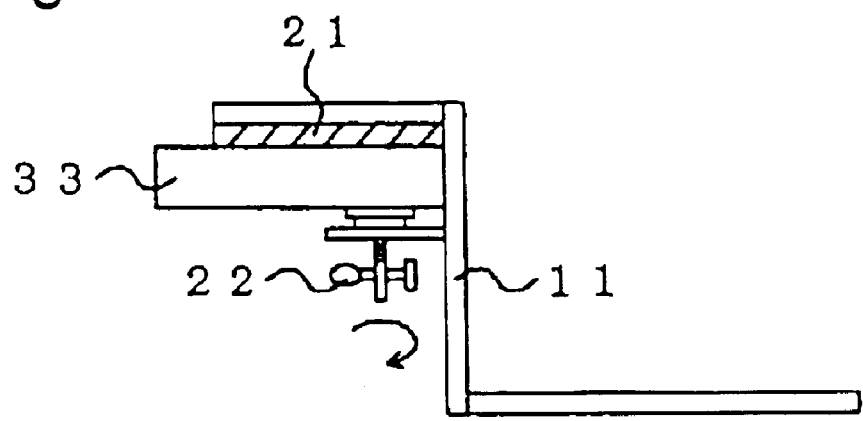
FIG. 8 is a side elevational view of the projector installation fixture according to the first embodiment of the present invention, which has a structure for keeping the projector installation fixture securely in place.

FIG. 8 shows a structure combined with projector installation fixture 11 for adjusting the gap "a". In FIG. 8, projector installation fixture 11 is combined with fixing fitting 22 having a threaded structure for adjusting the gap "a", which is generally used to fasten a lamp stand to a desk. If the thickness of the upper surface panel of a table or a desk on which projector installation fixture 11 is to be mounted does not match the gap "a" of channel-shaped member 11A, then projector installation fixture 11 is combined with two fixing fittings 22 for securely attaching projector installation fixture 11 to upper surface panel 33. Projector installation fixture 11 with such two fixing fittings 22 allows projector 11 to be stably installed on upper surface panel 33.

According to the first embodiment of the present invention, as described above, a front-projection projector which is capable of projecting enlarged images through wide projection angles over short projection distances, as shown in FIG. 5, is installed on an edge of a table or a desk by projector installation fixture 11 having a sufficient mechanical strength and a structure stably fixed in sandwiching relation to the upper surface panel of the table or the desk. Even when the front-projection projector is used in a very small meeting room, it can display large-size images without occupying any spaces on a meeting table in the meeting room. The front-projection projector can thus be used in small spaces where conventional projection systems could not be used.

Projector installation fixture 11 can easily be mounted on and dismounted from the table because channel-shaped member 11A only needs to be fitted over upper surface panel 33 and, if necessary, only the gap "a" needs to be adjusted by fixing fitting 22 after channel-shaped member 11A is fitted over upper surface panel 33. Even with projector installation fixture 11 attached to projector 1, projector 1 can stably be placed on a placement base or the like. Thereafter, after projector 1 is removed from the table, it can be used as an ordinary front-projection projector with projector installation fixture 11 attached thereto, conveniently in general places.

Projector 1 may simply be placed on the L-shaped member, so that projector 1 can easily be mounted on and dismounted from the L-shaped member.

Alternatively, projector 1 may be fastened to the L-shaped member by screws (not shown). In this case, projector 1 with projector installation fixture 11 fastened thereto may be handled as a projector.

FIGS. 3A, 3B, and 3C show the projection display system according to the first embodiment of the present invention, which is used in a meeting room according to one mode. In FIGS. 3A, 3B, and 3C, projector installation fixture 11 is attached to projector 11. Projector 1 with projector installation fixture 11 fastened thereto is fixedly mounted on an edge of upper surface plate 33 of the meeting table by projector installation fixture 11.

Although not shown, when a video signal is supplied from a notebook computer or the like via a cable or a wireless link to projector 1, projector 1 projects an image represented by the video signal through aspherical mirror 1B onto projection surface 23 such as a wall including a partition or a screen or the like installed on a wall.

The relationship between the distance from the table or the desk to the wall and the size of the projected image depends on the projection characteristics shown in FIG. 5 of projector 11.

In FIGS. 3A, 3B, and 3C, the distance between the table and the wall is of about 60 cm and the screen size is of about 60 inches diagonally across the screen.

A projection display system according to a second embodiment of the present invention will be described below with reference to FIGS. 9A and 9B, FIGS. 10A and 10B, and FIGS. 11A, 11B, and 11C.

According to the second embodiment, second projector installation fixture 12 for being mounted on upper surface plate 33 of a table or a desk and first projector installation fixture 11 for supporting projector 1 thereon are used in combination.

According to the first embodiment, single projector installation fixture 11 is employed. According to the second embodiment, two separate projector installation fixtures, i.e., second projector installation fixture 12 and first projector installation fixture 11, are used in combination. First projector installation fixture 11 for supporting projector 1 is free of a protrusion such as a channel-shaped member. Therefore, when projector 1 is dismounted from the table or the desk, projector 1 can be handled with ease.

Figure 10A:
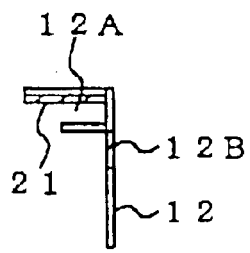
FIGS. 10A and 10B are views showing a projector installation fixture according to the second embodiment of the present invention.
Figure 10B:
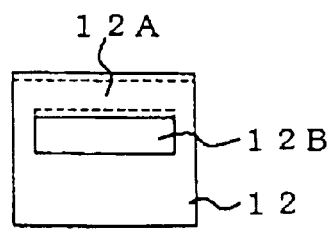

FIGS. 10A and 10B are a side elevational view and a front elevational view, respectively, of second projector installation fixture 12, which is produced by bending a metal plate or an insulating plate. Second projector installation fixture 12 has opening 12B defined therein below channel-shaped member 12A which receives upper surface panel 33 of the table or the desk that is inserted therein. A slip-prevention member 21 is attached to the lower surface of an upper plate of channel-shaped member 12A.

Figure 11A:
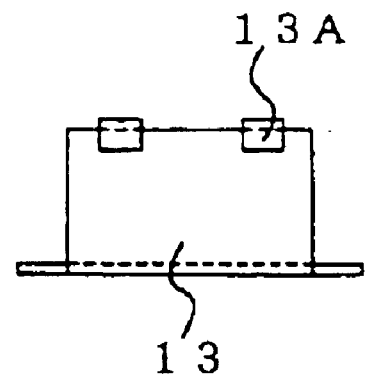
FIGS. 11A, 11B, and 11C are views showing another projector installation fixture according to the second embodiment of the present invention.
Figure 11B:
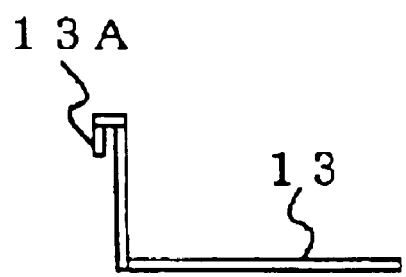
Figure 11C:
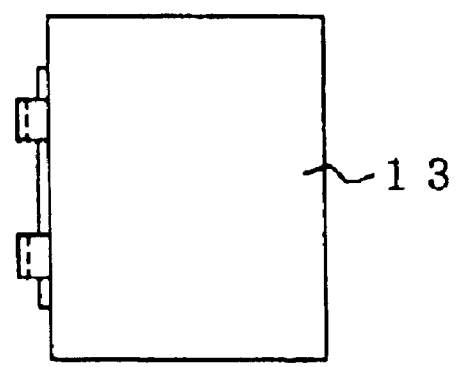

FIGS. 11A, 11B, and 11C are a front elevational view, a side elevational view, and a plan view, respectively, of first projector installation fixture 13, which is produced by bending a metal plate or an insulating plate. First projector installation fixture 13 has two inverted U-shaped members 13A disposed on an upper portion of the L-shaped member on which projector 1 is to be placed. Two inverted U-shaped members 13A are to be put in opening 12B defined in second projector installation fixture 12, thus combining first projector installation fixture 13 and second projector installation fixture 12 with each other.

Figure 9A:
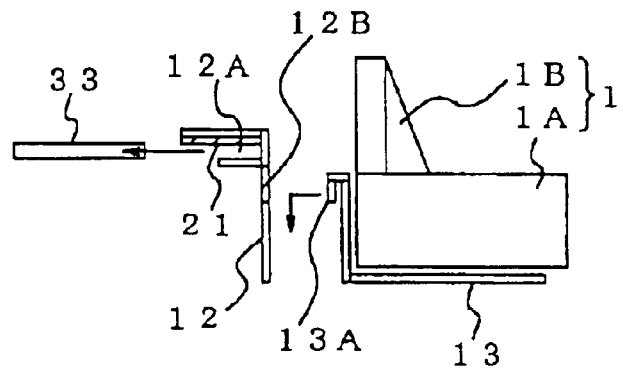
FIGS. 9A and 9B are views showing an installation structure according to a second embodiment of the present invention, FIG. 9A being a side elevational view of the installation structure immediately before the projector is installed, and FIG. 9B a side elevational view of the installation structure after the projector is installed.
Figure 9B:
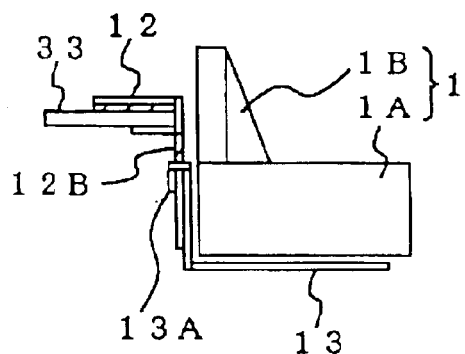

As shown in FIGS. 9A and 9B, channel-shaped member 12A of second projector installation fixture 12 is fitted over a side end of upper surface panel 33, and two inverted U-shaped members 13A are horizontally put in opening 12B defined in second projector installation fixture 12, after which first projector installation fixture 13 is slightly lowered. An edge portion of second projector installation fixture 12 which defines opening 12B is inserted into inverted U-shaped members 13A, thus locking first projector installation fixture 13 and second projector installation fixture 12 together.

First projector installation fixture 13 and second projector installation fixture 12 can easily be combined simply by horizontally putting two inverted U-shaped members 13A into opening 12B and then slightly lowering first projector installation fixture 13. First projector installation fixture 13 and second projector installation fixture 12 can easily be separated by reversing the above combining process. First projector installation fixture 13 and second projector installation fixture 12 can thus be assembled and disassembled with ease.

According to the second embodiment, if second projector installation fixture 12 is installed in advance on upper surface panel 33 of the table or the desk, then since first projector installation fixture 13 has no protrusions such as a channel-shaped member, projector 1 can be brought to upper surface panel 33 or other places as easily as if it were handled as a bare projector alone.

According to the second embodiment, as with the first embodiment, projector 1 may simply be placed on the L-shaped member of first projector installation fixture 13, so that projector 1 can easily be mounted on and dismounted from the L-shaped member.

Alternatively, projector 1 may be fastened to the L-shaped member by screws (not shown). In this case, projector 1 with first projector installation fixture 13 fastened thereto may be handled as a projector.

A projection display system according to a third embodiment of the present invention will be described below with reference to FIGS. 12A and 12B, and FIGS. 13A and 13B. The projection display system according to the third embodiment is a modification of the projection display system according to the second embodiment.

Figure 13A:
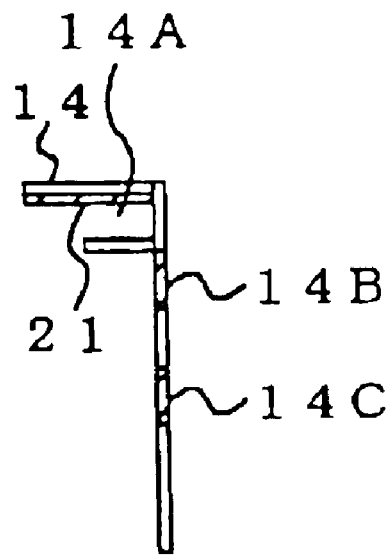
FIGS. 13A and 13B are views showing a projector installation fixture according to the third embodiment of the present invention, FIG. 13A being a side elevational view of the projector installation fixture, and FIG. 13B a side elevational view of the projector installation fixture.
Figure 13B:
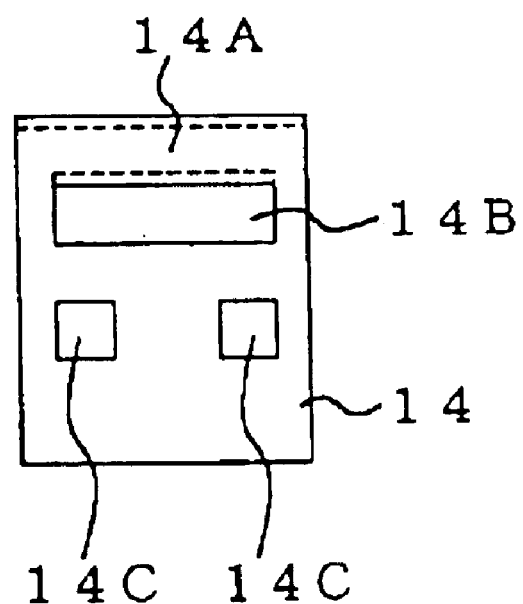

FIGS. 13A and 13B are a side elevational view and a front elevational view, respectively, of second projector installation fixture 14, which is produced by bending a metal plate or an insulating plate. Second projector installation fixture 14 has upper opening 14B and lower openings 14C defined therein below channel-shaped member 14A which receives upper surface panel 33 of the table or the desk that is inserted therein.

Figure 12A:
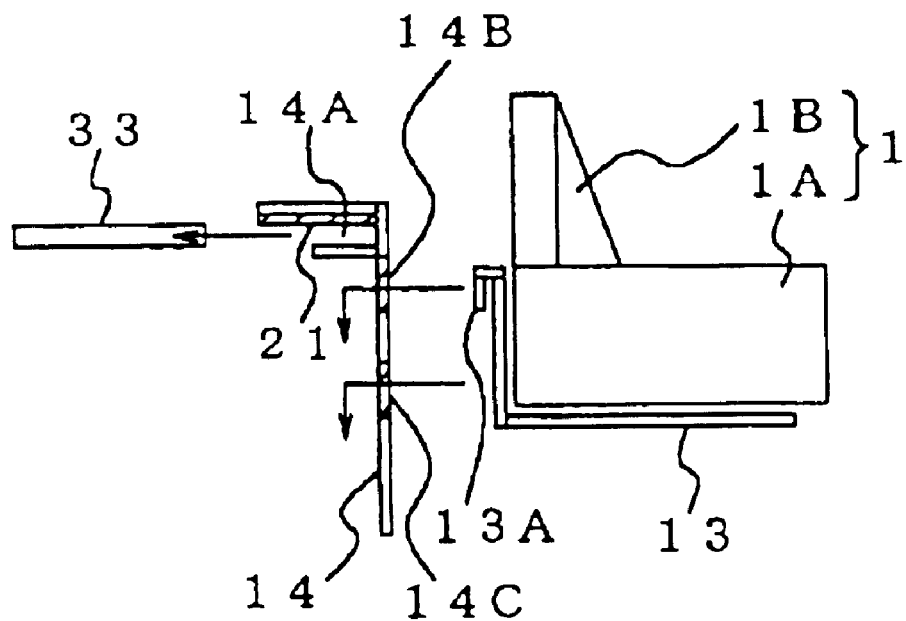
FIGS. 12A and 12B are views showing an installation structure according to a third embodiment of the present invention, FIG. 12A being a side elevational view of the installation structure immediately before the projector is installed, and FIG. 12B a side elevational view of the installation structure after the projector is installed.
Figure 12B:
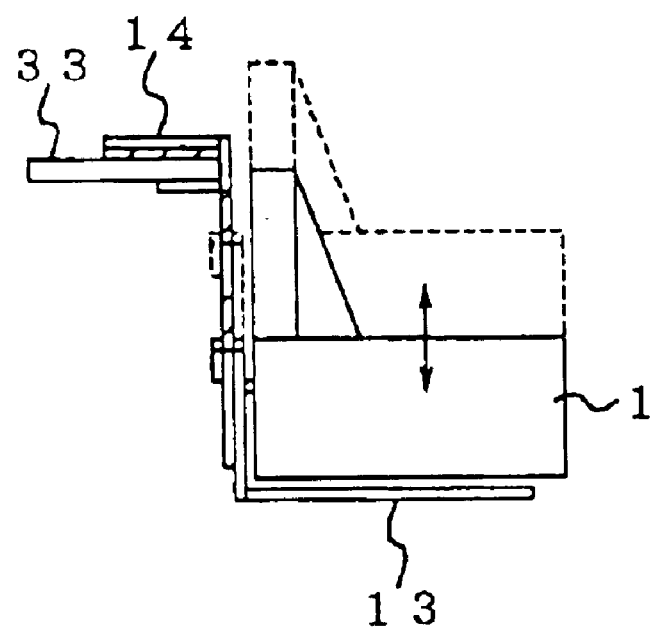

As shown in FIGS. 12A and 12B, first projector installation fixture 13 to be attached to projector 1 is identical to first projector installation fixture 13 according to the second embodiment. Second projector installation fixture 14 is installed in advance on upper surface panel 33 of the table or the desk. When projector 1 is to be installed on an edge of table 33, either upper opening 14B or lower openings 14C are selected depending on the environment in which projector 1 is used, and inverted U-shaped members 13A of first projector installation fixture 13 are put in selected opening 14B or openings 14C, thereby adjusting the height of projector 1. Specifically, either upper opening 14B or lower openings 14C are selected to adjust the vertical position of projected images or lower the position of projector 1 so that at least main projector unit 1A of projector 1 does not project upwardly beyond the upper surface of upper surface panel 33.

According to the third embodiment, as with the second embodiment, projector 1 may simply be placed on the L-shaped member of first projector installation fixture 13, so that projector 1 can easily be mounted on and dismounted from the L-shaped member.

Alternatively, projector 1 may be fastened to the L-shaped member by screws (not shown). In this case, projector 1 with first projector installation fixture 13 fastened thereto may be handled as a projector.

A projection display system according to a fourth embodiment of the present invention will be described below with reference to FIGS. 14A, 14B, 14C, and 14D. According to the fourth embodiment, projector installation fixture 16, which is produced by bending a metal plate or an insulating plate, has turning member 16C angularly movable between a vertical position and a horizontal position about pivot 16B.

Figure 14A:
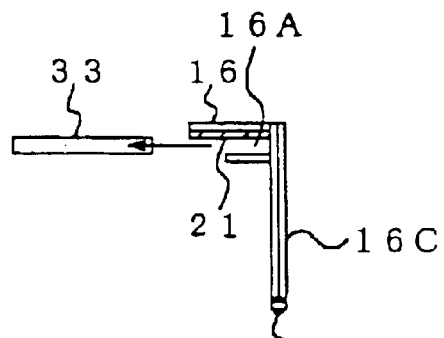
FIGS. 14A, 14B, 14C, and 14D are side elevational views showing a sequence of the manner in which a projector is installed on a table according to a fourth embodiment of the present invention.
Figure 14B:
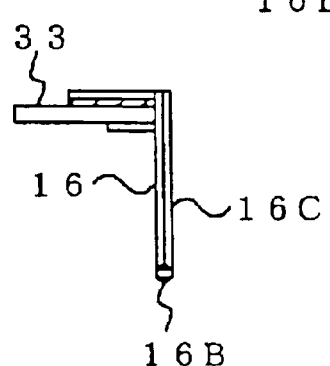
Figure 14C:
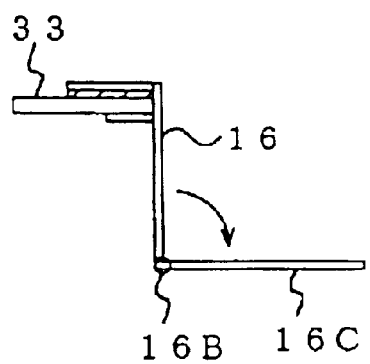
Figure 14D:
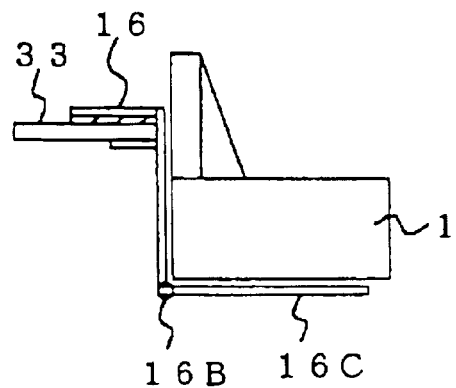
Figure 15A:
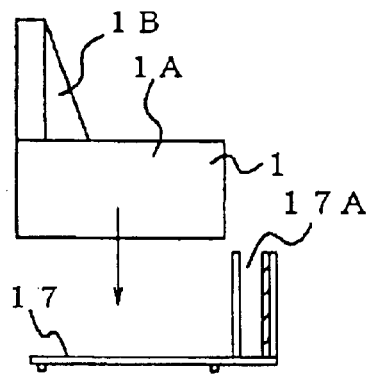
FIGS. 15A, 15B, 15C, and 15D are side elevational views showing a sequence of the manner in which a projector is installed on a partition according to a fifth embodiment of the present invention.
Figure 15B:
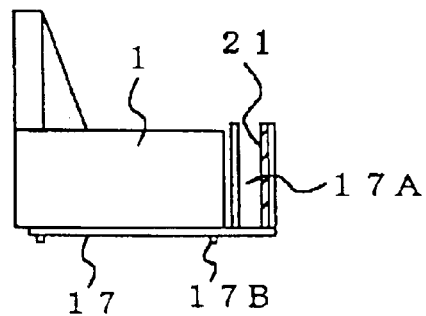
Figure 15C:
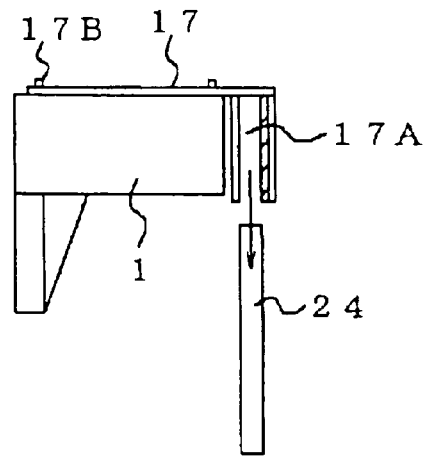
Figure 15D:
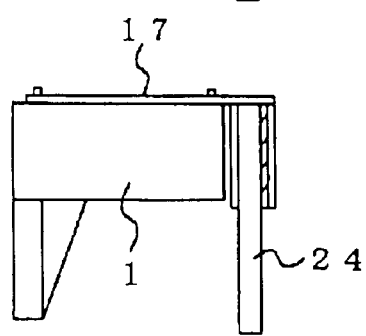

Channel-shaped member 16A of projector installation fixture 16 with turning member 16C in the vertical position is fitted over a side end of upper surface panel 33 (see FIGS. 14A and 14B). Then, turning member 16C is angularly moved into the horizontal position about pivot 16B (see FIG. 14C). Thereafter, projector 1 is placed on turning member 16C (see FIG. 14D).

According to the fourth embodiment shown in FIGS. 14A, 14B, 14C, and 14D, therefore, projector installation fixture 16 has turning member 16C that is angularly movable through 90 degrees and channel-shaped member 16A for securely sandwiching upper surface panel 33 of the table or the desk.

According to the fourth embodiment, when projector 1 is to be used, turning member 16C is angularly moved 90° into the horizontal position, and projector 1 is placed on turning member 16C. Since it is not necessary to attach projector installation fixture 16 to projector 1, projector 1 can be installed highly simply on the table or the desk. The mechanism for angularly moving turning member 16C and a mechanism for locking turning member 16C in the horizontal position are well known and will not be described below.

The projection display system according to the fifth embodiment of the present invention, which has been mentioned above, will be described below with reference to FIGS. 15A, 15B, 15C, and 15D, and FIGS. 4A and 4B. According to the fifth embodiment, the projector is installed on a partition serving as a wall in a room that is divided by partitions.

FIGS. 15A, 15B, 15C, and 15D show a sequence of the manner in which projector 1 is installed on partition 24. Projector installation fixture 17 has channel-shaped member 17A for sandwiching partition 24 and sheet-like slip prevention member 21 applied to an inner surface of channel-shaped member 17A.

Main projector unit 11A of projector 1 may be fastened to a flat portion of projector installation fixture 17 by screws 17B, using a structure on projector 1. Projector 1 with projector installation fixture 17 attached thereto may be put and used in general places.

Successive installation steps shown respectively in FIGS. 15A, 15B, 15C, and 15D will be described below. With the opening of channel-shaped member 17A being directed upwardly, projector 1 is placed downwardly on the flat portion of projector installation fixture 17. Then, projector 1 is fastened to the flat portion of projector installation fixture 17 by screws 17B or the like (see FIGS. 15A and 15B). Projector 1 fastened to the flat portion of projector installation fixture 17 by screws 17B or the like may be handled as a projector prior to installation on partition 24.

Then, the projector is turned upside down so as to position projector 1 beneath projector installation fixture 17 with the opening of channel-shaped member 17A being directed downwardly. The projector is lowered to fit the opening of channel-shaped member 17A over the upper end of partition 24 (see FIG. 15C), whereupon projector 1 is suspended from the upper end of partition 24 (see FIG. 15D).

At this time, since slip prevention member 21 is applied to the inner surface of channel-shaped member 17A, projector installation fixture 17 can stably be fixed to partition 24 provided that the gap in channel-shaped member 17A and the thickness of partition 24 match each other. Projector 1 can thus be brought into a state ready for use simply by fitting channel-shaped member 17A of projector installation fixture 17 over partition 24.

Projector 1 can easily be removed from partition 24 by lifting projector installation fixture 17. Therefore, projector installation fixture 17 can easily be mounted on and dismounted from partition 24.

If the thickness of partition 24 does not match the gap in channel-shaped member 17A, then fixing fitting 22 as shown in FIG. 8 may be combined with projector installation fixture 17 for securely fastening projector installation fixture 17 to partition 24.

FIGS. 4A and 4B show the projection display system according to the fifth embodiment of the present invention, which is used according to one specific mode. As shown in FIGS. 4A and 4B, large images can be displayed by projector 1 in a small space which is defined by partitions. If projector 1 used in the mode shown in FIGS. 4A and 4B can display projected images on a screen of about 35 inches diagonally across the screen if projector 1 has the projection characteristics shown in FIG. 5.

In the fifth embodiment, a cable connected from a personal computer to the projector may present an obstacle. However, the projector may be used without any cable physically connected thereto because image signals can be supplied to the projector through a wireless link or from a memory medium set in the projector.

A projection display system according to a sixth embodiment of the present invention will be described below with reference to FIGS. 16A, 16B, and 16C through FIGS. 20A and 20B.

According to the fifth embodiment, the projector is installed on the upper end of the partition. According to the sixth embodiment, however, a projector is installed on a vertical surface of a wall including a general partition.

Figure 16A:
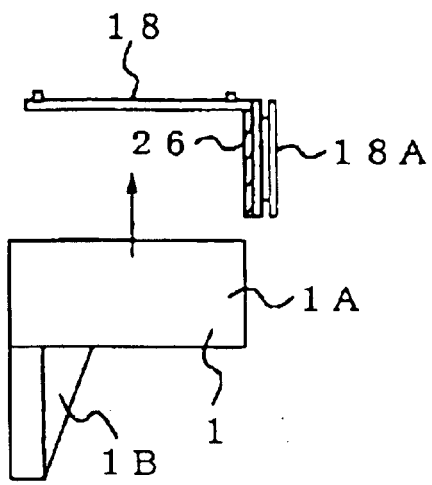
FIGS. 16A, 16B, and 16C are side elevational views showing a sequence of the manner in which a projector is installed on a wall according to a sixth embodiment of the present invention.
Figure 16B:
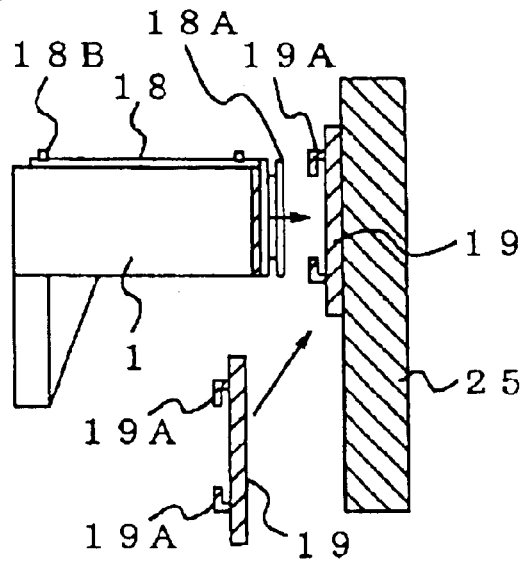
Figure 16C:
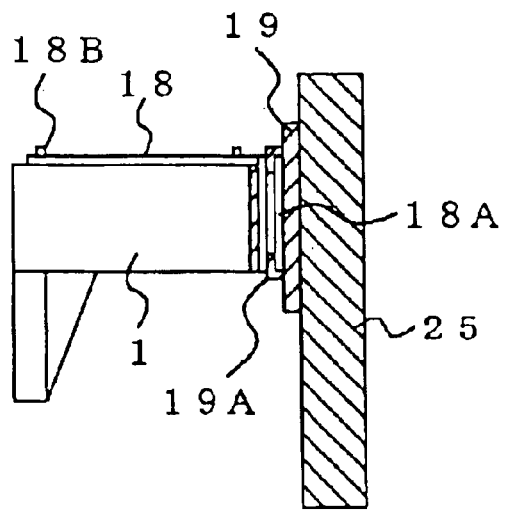

FIGS. 16A, 16B, and 16C show an installing structure in side elevation. According to the sixth embodiment, first projector installation fixture 18 and second projector installation fixture 19 are employed to install projector 1.

First projector installation fixture 18 is attached to projector 1 (see FIG. 16A), and second projector installation fixture 19 is attached to wall 25 (see FIG. 16B). First projector installation fixture 18 has protrusions 18a disposed on upper and lower edges of a side surface thereof and horizontally slid between and coupled to a pair of L-shaped rails 19A of second projector installation fixture 19 (see FIG. 16C). In this manner, projector 1 that is mounted on first projector installation fixture 18 is fixed to second projector installation fixture 19 that is mounted on wall 25.

Both first projector installation fixture 18 and second projector installation fixture 19 are made of such a material and have such a structure which provide a sufficient mechanical strength to support projector 1 horizontally.

Vibroisolating member 26 is mounted on a surface of L-shaped first projector installation fixture 18 which is held against a side of projector 1.

Figure 17A:
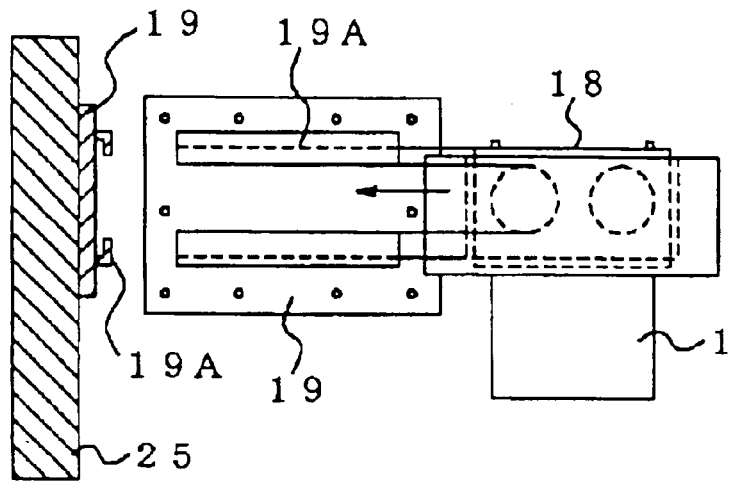
FIGS. 17A, 17B, and 17C are views showing a sequence of the manner in which the projector is installed on the wall according to the sixth embodiment of the present invention, FIG. 17A being a front elevational view, partly in side elevation, FIG. 17B a front elevational view, and FIG. 17C a plan view.
Figure 17B:
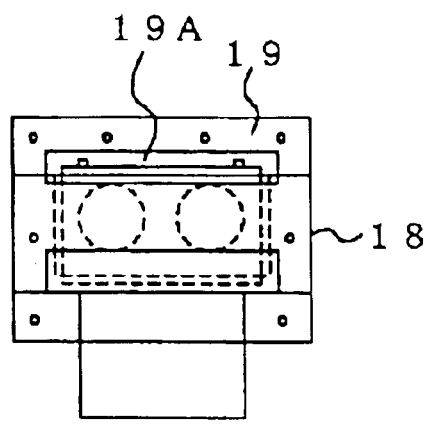
Figure 17C:
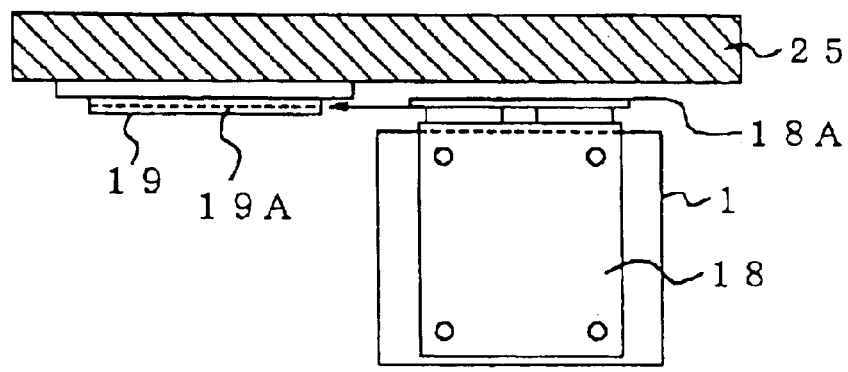

FIGS. 17A and 17B are a front elevational view, partly in side elevation, and a front elevational view, respectively, of the installing structure according to the sixth embodiment. FIG. 17C is a plan view of the installing structure as seen from the ceiling.

As shown in FIGS. 16A, 16B, and 16C and FIGS. 17A, 17B, and 17C, protrusions 18a disposed on a vertical portion of first projector installation fixture 18 that extends perpendicularly to a flat portion thereof to which projector 1 is fastened by screws 18B or the like are horizontally inserted in a groove defined between rails 19A of second projector installation fixture 19 that is mounted on a vertical surface of wall 25, and slid and coupled to rails 19A. Protrusions 18a of first projector installation fixture 18 are complementary in shape to the groove defined between rails 19A of second projector installation fixture 19.

Before projector 1 is removably installed on wall 25 by second projector installation fixture 19, main projector unit 1A of projector 1 is fixed to first projector installation fixture 18 by screws 18B or the like. Projector 1 with first projector installation fixture 18 fastened thereto may be handled as a projector.

Figure 18A:
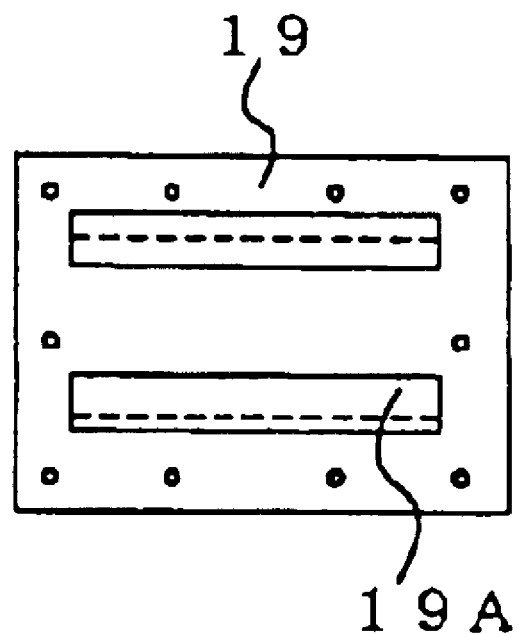
FIGS. 18A and 18B are views showing a projector installation fixture on the wall according to the sixth embodiment of the present invention, FIG. 18A being a front elevational view of the projector installation fixture, and FIG. 18B a side elevational view of the projector installation fixture.
Figure 18B:
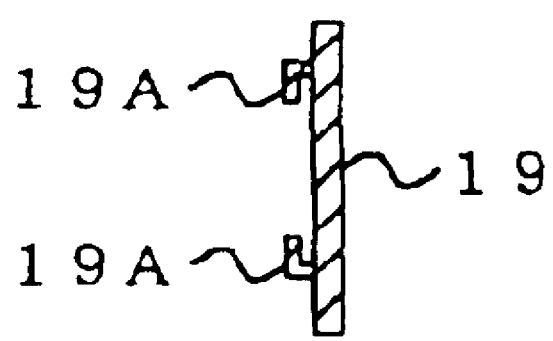
Figure 19A:
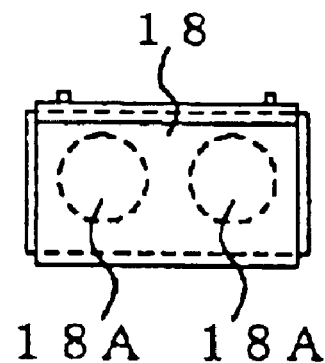
FIGS. 19A, 19B, and 19C are views showing a projector installation fixture on the projector according to the sixth embodiment of the present invention, FIG. 19A being a front elevational view of the projector installation fixture, FIG. 19B a side elevational view of the projector installation fixture, and FIG. 19C a plan view of the projector installation fixture.
Figure 19B:
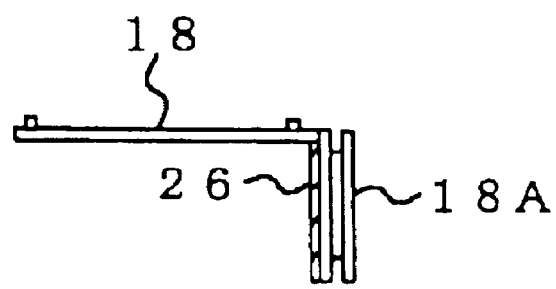
Figure 19C:
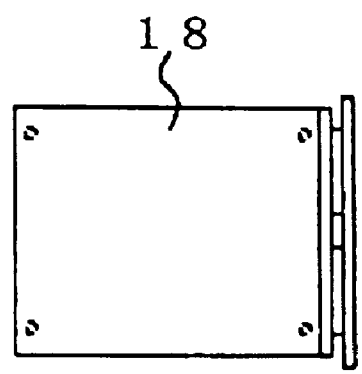

FIGS. 18A and 18B show second projector installation fixture 19 to be mounted on the wall according to the sixth embodiment of the present invention. FIG. 18A is a front elevational view of second projector installation fixture 19, and FIG. 18B is a side elevational view of second projector installation fixture 19. FIGS. 19A, 19B, and 19C show first projector installation fixture 18 to be mounted on the projector according to the sixth embodiment of the present invention. FIG. 19A is a front elevational view of first projector installation fixture 18, FIG. 19B is a side elevational view of first projector installation fixture 18, and FIG. 19C is a plan view of first projector installation fixture 18.

The insertion members on the side wall surface of first projector installation fixture 18, i.e., protrusions 18A, comprise two flat plates having an appropriate thickness which are attached to the side wall surface by respective disks. Protrusions 18A made up of the flat plates are slid and fitted in the groove defined between the rails 19A of second projector installation fixture 19.

First projector installation fixture 18 can thus simply be slid so as to be attached to second projector installation fixture 19, and simply be slid so as to be detached from second projector installation fixture 19. Therefore, first projector installation fixture 18 can easily be attached to and detached from second projector installation fixture 19.

Although not shown, second projector installation fixture 19 actually has a stop mechanism for stopping first projector installation fixture 18 and a lock mechanism for locking first projector installation fixture 18 when first projector installation fixture 18 is slidably inserted into the groove. First projector installation fixture 18 is arranged such that it can smoothly be inserted into second projector installation fixture 19. As described above, vibroisolating member 26 is mounted on the surface of first projector installation fixture 18 which is held against the side of projector 1, for thereby preventing projector 1 from suffering unwanted vibrations.

According to the sixth embodiment, as with the other embodiments, projector 1 with first projector installation fixture 18 attached thereto can directly be used in general places.

In the sixth embodiment, the rails are attached to the second projector installation fixture mounted on the wall, and the protrusions are attached on the first projector installation fixture mounted on the projector. However, the protrusions may be attached to the projector installation fixture mounted on the wall, and the rails may be attached on the projector installation fixture mounted on the projector.

Figure 20A:
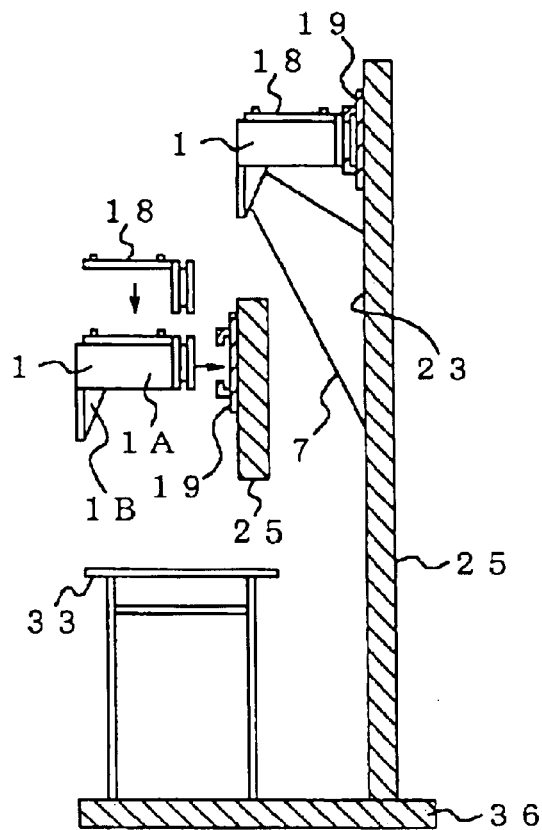
FIGS. 20A and 20B are views showing a projection display system according to the sixth embodiment of the present invention, which is used in a meeting room according to one mode, FIG. 20A being side elevational view of the projection display system, including a side elevational view before the projector is installed, and FIG. 20B a front elevational view of the projection display system.
Figure 20B:
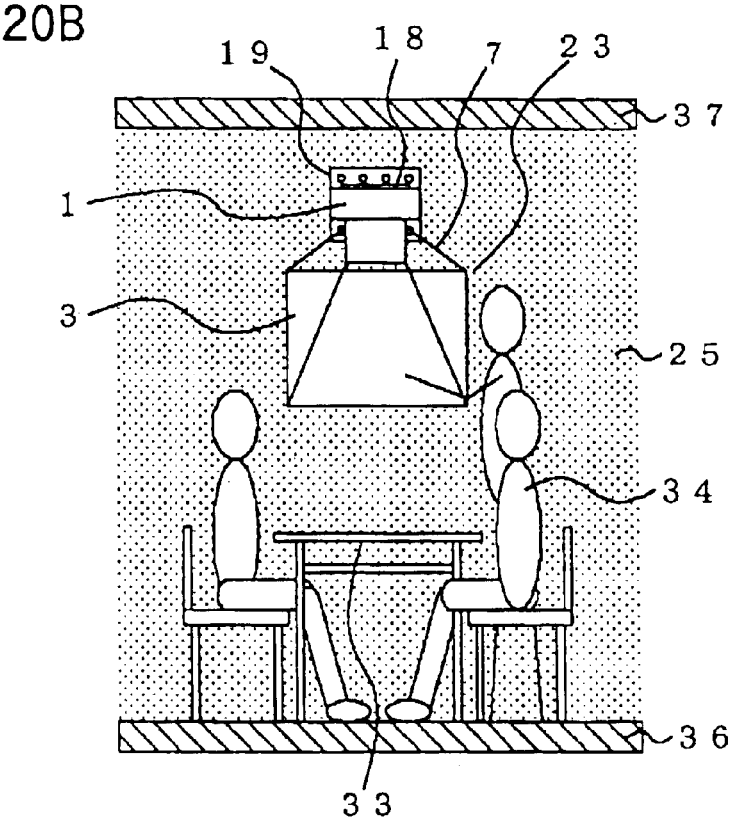

FIGS. 20A and 20B show the projection display system according to the sixth embodiment of the present invention, which is used according to a specific mode. FIG. 20A is a side elevational view of the projection display system, and FIG. 20B is a front elevational view of the projection display system. As shown in FIGS. 20A and 20B, projector 1 is detachably mounted on wall 25 at a position higher than upper surface plate 33 of a meeting desk or table by first projector installation fixture 18 and second projector installation fixture 19. Since projector 1 is not placed on upper surface plate 33, the space over upper surface plate 33 can effectively be utilized.

According to the sixth embodiment, projector 1 can display projected images on a screen of about 40 inches diagonally across the screen if projector 1 has the projection characteristics shown in FIG. 5. According to the sixth embodiment, since the projector can easily be mounted on and dismounted from a general wall and does not take up a large installation space, it can easily display large projected images in spaces which may be small and not deep.

According to the embodiments of the present invention, a large screen display system comprises a front-projection projector which is capable of projecting enlarged images through wide projection angles over short projection distances, and a projector installation fixture mounted on the projector and having a structure that can easily be mounted on and dismounted from a table, a partition, or a wall. Even the large screen display system is used in a small room or space, it does not take up any space over the table, and projected light from the projector is not blocked by objects or activities on the table. As the large screen display system can easily be installed or removed, it is not limited to any places for use, but can be used in various places.

As described above, the present invention offers the following advantages:

The first advantage is that large projected images can be displayed without occupying the space over a table or a desk and without blocking projected light from the projector in various occasions including meetings, training sessions, educational events, etc., that take place in small rooms with a few attendants. According to the present invention, the space over a table or a desk, which could not heretofore be used in meetings and training courses, can be used, and projectors can be used in places or spaces which heretofore have been too small to use projectors therein. As a result, activities are made highly efficient, spaces can be utilized highly efficiently, and space saving can be achieved in various occasions including meetings, training sessions, educational events, etc.

The reasons for the foregoing advantage are that a front-projection projector which is capable of projecting enlarged images through wide projection angles over short projection distances is detachably mounted on a table, a desk, a partition, a wall, or the like by a projector installation fixture, thus providing a large screen display system.

The second advantage is that a large screen display system having excellent portability, installability, and applicability is provided for use in small spaces.

The reasons for the foregoing advantage are that although the large screen display system employs a projector installation fixture, it allows the projector to be mounted and dismounted with utmost ease, the projector with the projector installation fixture attached thereto may be used as the projector itself without failure, and the projector with the projector installation fixture attached thereto can easily be fixed to a table, a desk, a partition, a wall, or the like.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. A projection display system comprising:
a front-projection projector for projecting images onto a projection surface; and
a projector installation fixture for detachably mounting said projector on a side end of an upper surface panel of a table or desk,
wherein said projector installation fixture is arranged to install said projector such that at least a main projector unit thereof is positioned beneath an upper surface of said upper surface panel.

2. A projection display system comprising:
a front-projection projector for projecting images onto a projection surface; and
a projector installation fixture for detachably mounting said projector on a unit that is one of a furnishing in a room where said projector is to be used and a wall or partition defining the room,
said projector installation fixture comprising a first member having an L-shaped member for placing said projector thereon and a second member having a channel-shaped member for inserting therein a portion of said unit on which said projector is to be mounted,
wherein said projector installation fixture further comprises a slip prevention member attached to an inner surface of said channel-shaped member.

3. A projection display system according to claim 2, wherein said unit comprises a table or a desk, and said projector installation fixture is mountable on a side end of an upper surface panel of said table or desk.

4. A projection display system according to claim 2, wherein said projector installation fixture further comprises a fixing fitting having a threaded structure for varying a gap in said channel-shaped member if said gap is greater than the thickness of said portion of said unit on which said projector is to be mounted.

5. A projection display system according to claim 2, wherein said unit comprises a partition defining the room and said projector installation fixture is mountable on an upper end of said partition.

6. A projection display system comprising:
a front-projection projector for projecting images onto a projection surface; and
a projector installation fixture for detachably mounting said projector on a partition defining a room where said projector is to be used, said projector installation fixture being mounted on an upper end of said partition to suspend said projector from the upper end of said partition for projecting images onto the projection surface on said partition.

7. A projection display system comprising:
a front-projection projector for projecting images onto a projection surface; and
a projector installation fixture for detachably mounting said projector on a wall defining a room where said projector is to be used, said projector installation fixture being mounted on an upper portion of a wall surface of said wall to suspend said projector from the upper portion of the wall surface for projecting images onto the projection surface on said wall surface.

8. A projection display system comprising:
a front-projection projector for projecting images onto a projection surface; and
a projector installation fixture for detachably mounting said projector on a unit that is one of a furnishing in a room where said projector is to be used and a wall or partition defining the room,
said projector installation fixture comprising a first member having an L-shaped member for placing said projector thereon and a second member having a channel-shaped member for inserting therein a portion of said unit on which said projector is to be mounted,
wherein said first member has a turning member angularly movable between a horizontal position and a vertical position, the arrangement being such that said turning member is angularly moved into said horizontal position to provide said L-shaped member when said projector is to be placed thereon.

9. A projection display system comprising:
a front-projection projector for projecting images onto a projection surface; and
a projector installation fixture for detachably mounting said projector on a unit that is one of a furnishing in a room where said projector is to be used and a wall or partition defining the room,
said projector installation fixture comprising a first projection installation fixture adapted to be mounted on said projector and a second projector installation fixture adapted to be mounted on said unit, said second projection installation fixture being separable from said first projector installation fixture,
wherein said first projector installation fixture has a downwardly directed U-shaped member, and said second projector installation fixture has an opening for inserting therein said downwardly directed U-shaped member of said first projector installation fixture, said opening being defined by a plate which is engageable in an opening in said downwardly directed U-shaped member for joining said first projector installation fixture and said second projector installation fixture to each other.

10. A projection display system according to claim 9, wherein said first projector installation fixture has a plurality of said downwardly directed U-shaped members.

11. A projection display system according to claim 9, wherein said second projector installation fixture has a plurality of said openings defined therein at different heights.

12. A projection display system comprising:
a front-projection projector for projecting images onto a projection surface; and
a projector installation fixture for detachably mounting said projector on a unit that is one of a furnishing in a room where said projector is to be used and a wall or partition defining the room,
said projector installation fixture comprising a first projection installation fixture adapted to be mounted on said projector and a second projector installation fixture adapted to be mounted on said unit, said first and second projection installation fixtures having respective slideable joint members that are engageable with each other, wherein said slidable joint members of said first projector installation fixture and said second projector installation fixture comprise a pair of L-shaped rails mounted on either one of said first projector installation fixture and said second projector installation fixture, and protrusions mounted on the other one of said first projector installation fixture and said second projector installation fixture, for sliding movement in a space surrounded by said L-shaped rails.

13. A front-projection projector for projecting images onto a projection surface, the projector comprising:

a projector installation fixture for detachably mounting the projector on a unit that is one of a furnishing in a room where the projector is to be used and a wall or partition defining the room, said projector installation fixture comprising a support-side installation adapted to be mounted on said unit, wherein said projector installation fixture has a downwardly directed U-shaped member, and said support-side installation fixture has an opening for inserting therein said downwardly directed U-shaped member of said projector installation fixture, said opening being defined by a plate which is engageable in an opening in said downwardly directed U-shaped member for joining said projector installation fixture and said support-side installation fixture to each other.

14. A front-projection projector according to claim 13, wherein said projector installation fixture has an L-shaped member for placing said projector thereon.

15. A front-projection projector according to claim 13, wherein said projector has an optical system including an aspherical mirror at a final stage thereof.

* * * * *